US009102123B2

(12) United States Patent
Torr

(10) Patent No.: US 9,102,123 B2
(45) Date of Patent: Aug. 11, 2015

(54) GLAZING

(75) Inventor: Ashley Carl Torr, Ormskirk (GB)

(73) Assignee: PILKINGTON AUTOMOTIVE LIMITED, Merseyside (GB)

( * ) Notice: Subject to any disclaimer, the term of this patent is extended or adjusted under 35 U.S.C. 154(b) by 0 days.

(21) Appl. No.: 12/279,518

(22) PCT Filed: Feb. 14, 2007

(86) PCT No.: PCT/GB2007/050062
§ 371 (c)(1),
(2), (4) Date: Sep. 23, 2008

(87) PCT Pub. No.: WO2007/093828
PCT Pub. Date: Aug. 23, 2007

(65) Prior Publication Data
US 2009/0098354 A1    Apr. 16, 2009

(30) Foreign Application Priority Data

Feb. 14, 2006  (GB) .................................. 0602941.7

(51) Int. Cl.
*B32B 17/10* (2006.01)
*B32B 7/02* (2006.01)

(52) U.S. Cl.
CPC ..... *B32B 17/10339* (2013.01); *B32B 17/10036* (2013.01); *B32B 17/10761* (2013.01); *Y10T 428/24967* (2015.01)

(58) Field of Classification Search
CPC ........ B32B 27/00; B32B 27/08; B32B 15/08; B32B 27/32; B32B 17/10761
USPC ................................................ 428/212, 215
See application file for complete search history.

(56) References Cited

U.S. PATENT DOCUMENTS

| 3,958,245 | A | * | 5/1976 | Cherenko et al. ............. 343/713 |
| 4,085,092 | A | * | 4/1978 | Chang et al. .................... 528/80 |
| 4,086,595 | A | * | 4/1978 | Cherenko et al. ............. 343/713 |
| 4,107,366 | A | * | 8/1978 | Rieser et al. ................... 428/215 |
| 5,154,953 | A | | 10/1992 | de Moncuit et al. |
| 5,849,402 | A | | 12/1998 | Kraemling et al. |
| 6,010,775 | A | | 1/2000 | Kraemling et al. |

(Continued)

FOREIGN PATENT DOCUMENTS

AU    2006211298 B2 *   8/2006
EP       0 457 190 A    11/1991

(Continued)

OTHER PUBLICATIONS

Search Report issued by the United Kingdom Intellectual Property Office in priority application No. GB0602941.7, May 30, 2006.
PCT/ISA/210 (International Search Report), 2007.

*Primary Examiner* — Tahseen N Khan
(74) *Attorney, Agent, or Firm* — Buchanan Ingersoll & Rooney PC

(57) ABSTRACT

A laminated glazing comprising an inner ply of glass and an outer ply of glass having a generally opaque interlayer laminated therebetween is disclosed. When the interlayer, in a thickness of 0.76 mm, is laminated between two plies of glass, each 2.1 mm thick and having an LT greater than 88% (CIE Illuminant A), the resultant glazing has an LT (CIE Illuminant A) of less than 40%, a TE (ISO9050:E(2003), air mass 1.5) of less than 45%; and an acoustic transmission loss of greater than 40 dB in the range 3000 to 4000 Hz at 21° C.

20 Claims, 4 Drawing Sheets

(56) References Cited

U.S. PATENT DOCUMENTS

| | | | |
|---|---|---|---|
| 6,825,255 B2 * | 11/2004 | Yuan et al. | 524/230 |
| 6,887,577 B1 * | 5/2005 | Keller et al. | 428/436 |
| 2002/0061375 A1 * | 5/2002 | Cartledge et al. | 428/36.9 |
| 2002/0150744 A1 | 10/2002 | Nagai | |
| 2003/0183322 A1 * | 10/2003 | Bolognese et al. | 156/99 |
| 2004/0219368 A1 | 11/2004 | Coster et al. | |
| 2005/0002081 A1 * | 1/2005 | Beteille et al. | 359/275 |
| 2005/0233136 A1 | 10/2005 | Offermann et al. | |
| 2006/0008648 A1 * | 1/2006 | Bennison et al. | 428/411.1 |
| 2006/0134438 A1 | 6/2006 | Coster et al. | |

FOREIGN PATENT DOCUMENTS

| | | |
|---|---|---|
| EP | 0 687 554 A | 12/1995 |
| EP | 0 763 420 A1 | 3/1997 |
| EP | 1 060 876 A2 | 12/2000 |
| GB | 2 134 444 A | 8/1984 |
| WO | WO 01/02167 | 1/2001 |
| WO | WO 2004/039581 A1 | 5/2004 |
| WO | WO 2005007592 A2 * | 1/2005 |
| WO | WO 2005/018929 A1 | 3/2005 |
| WO | WO 2005/115747 A1 | 12/2005 |

* cited by examiner

GLAZING

The present invention relates to automotive glazings, in particular, automotive glazings having sound absorption, thermal and optical control properties.

Modern automotive glazings, in particular, laminated automotive glazings, typically serve to provide more than just a window in a vehicle. Glazings can be used to provide increased security, safety and intruder resistance; they may have sound damping properties, to reduce both road and engine noise within the vehicle; they may provide thermal control to help regulate the temperature within the vehicle, optical control, to reduce glare or solar control to reduce heat and glare. Such additional functionality may be provided by modifications to the glass, or by using a particular type of interlayer.

To increase the security and safety of a glazing, either a film can be applied to the surface of a single ply of glass, or an interlayer can be used in a laminated glazing. The main role of the film or interlayer is to hold together shards of glass if the glazing is broken. The film or interlayer also provides a degree of mechanical strength. A tinted film or tinted interlayer may also be used to reduce glare coming into the vehicle, or the glass ply itself may be tinted or coloured. In laminated glazings, an interlayer offering sound damping or insulation may be used to reduce road or engine noise within a vehicle. To provide thermal, optical and/or solar control, coatings may be present on at least one surface of a ply of glass. In laminated glazings, each ply of glass within the laminate may be coated. The coatings used may be electrically conductive, allowing various electronic devices to be sited within or on the glazing.

A variety of these functions may also be combined within an automotive glazing. In particular, in rooflights and sidelights, it is desirous to be able to absorb or damp sound to reduce external noise within the vehicle whilst also providing thermal and solar control as well as glare reduction. To reduce external noise, two plies of the tinted glass may be laminated with a sound absorbing interlayer.

For example, WO2005/115747 discloses a laminated glazing construction for the roof of an automotive vehicle using a combination of lightly tinted glass, an acoustic interlayer and low emissivity and solar control coatings. The PVB interlayer may alternatively provide infra red absorption properties. However, the overall LT (CIE Illuminant A) of the glazing is still relatively high, at over 46%.

In order to reduce LT when the glass used is relatively thin (e.g. between 1.6 mm and 4.0 mm in thickness), which is desirable in order to reduce the weight whilst retaining sufficient mechanical strength to be used in the door or roof of a vehicle, heavy tinting may be required to provide additional thermal control and glare reduction.

Heavily tinted glass is more costly to make than clear or lightly tinted float glass. A heavily tinted glass is one where typically, the iron content (measured as $Fe_2O_3$) is greater than 1.2 wt %. This results in an LT (CIE Illuminant A) of between 80% and 39% at 2.1 mm thick. A lightly tinted glass would be one in which the $Fe_2O_3$ content is 1.2 wt % or less for a 2.1 mm glass ply. The greater the amount of iron added, the longer the time taken to switch a float line from producing clear glass to heavily tinted glass. For this reason, relatively little heavily tinted glass is produced. Once produced, the glass must be stored and shipped to its final destination. This may involve shipping glass from one or two float lines to several different countries to produce finished glazings. Additional processing and/or development work may be necessary to turn the glass into a finished product. All of these factors lead to an increase in cost. Therefore, although multifunctional glazings can be made using such heavily tinted glasses in conjunction with a PVB interlayer giving enhanced acoustic properties, the cost is likely to be prohibitive for mass market applications.

One further reason for the increased cost of thin (less than 2 mm thick) heavily tinted automotive glasses is that such glass is typically used in laminated tinted rooflights and sidelights. These glazings form a relatively small market compared to the market for windscreens, where glass thicknesses below 2 mm are regularly used. The ability to use lightly tinted thin glass, regularly produced for the windscreen market for both rooflights and sidelights would be a significant advantage, as the need to produce or proliferate many types of costly, heavily tinted glass would be reduced or removed.

There is therefore a need to be able to produce multifunctional glazings, offering sound insulation, thermal and preferably, solar control properties, using more readily available and less costly glass.

The present invention aims to address these problems by providing a laminated glazing comprising an inner ply of glass and an outer ply of glass having a generally opaque interlayer laminated therebetween, wherein, when the interlayer, in a thickness of 0.76 mm, is laminated between two plies of glass, each 2.1 mm thick and having an LT greater than 88% (CIE Illuminant A), the resultant glazing has an LT (CIE Illuminant A) of less than 40%, a TE (ISO9050:E(2003), air mass 1.5) of less than 45%, and an acoustic transmission loss of greater than 40 dB in the range 3000 to 4000 Hz at 21° C.

By combining optical, thermal and acoustic control properties in the interlayer, it is possible to form multifunctional glazings from widely available clear or lightly tinted glass. This reduces manufacturing, storage and shipping costs, and enables processing of the glass to produce shaped and coated glazings not previously available.

Preferably, the interlayer is a polyvinyl butyral (PVB) interlayer. Preferably, the interlayer is body tinted. The interlayer may be of a bilayer construction, or the interlayer may be of a trilayer construction. In the latter case, at least one of the layers of the trilayer may be body tinted.

The glazing may have a colour box transmission, with a 2 degree observer angle, Illuminant D65, in the ranges L*: +20 to +60, a*: −1 to −18, and b*: −16 to +9.

The first ply of glass and the second ply of glass may each have an iron content, measured as $Fe_2O_3$, of less than 0.15 wt %.

Alternatively, the first ply of glass and the second ply of glass may each have an iron content, measured as $Fe_2O_3$, of between 0.5 and 1.2 wt %. In this case, the glazing preferably has an LT (CIE Illuminant A) of less than 35% and a TE (ISO9050:E(2003), air mass 1.5) of less than 35%. More preferably, the glazing has an LT (CIE Illuminant A) in the range 10% to 30%. Yet more preferably, the glazing has an LT (CIE Illuminant A) in the range 12% to 23%. Preferably, the glazing also has a TE (ISO9050:E(2003), air mass 1.5) of less than 20%. More preferably, the glazing also has a TE (ISO9050:E(2003), air mass 1.5) of less than 16%.

A low emissivity coating may be provided on the outer surface of the inner ply of glass. A solar control coating may be provided on the inner surface of the outer ply of glass. The coating may be electrically conductive. If this is the case, the coating may be used as a substrate for at least one electrical device.

Preferably, the inner and outer plies of glass each have a thickness in the range 1 mm to 4 mm. More preferably, at least one of the inner and outer ply of glass has a thickness of at least 1.4 mm, and the overall thickness of the laminated glazing is less than 6.5 mm.

Preferably, the glazing is an automotive glazing, more preferably, a rooflight or a sidelight.

Alternatively, the inner and outer plies of glass may each have a thickness in the range 1.6 mm to 19 mm. In this case, the glazing may be an architectural glazing.

Preferably, the interlayer has a thickness of less than 1 mm.

The invention will now be described by way of example only, and with reference to the accompanying drawings in which.

Figure 1:
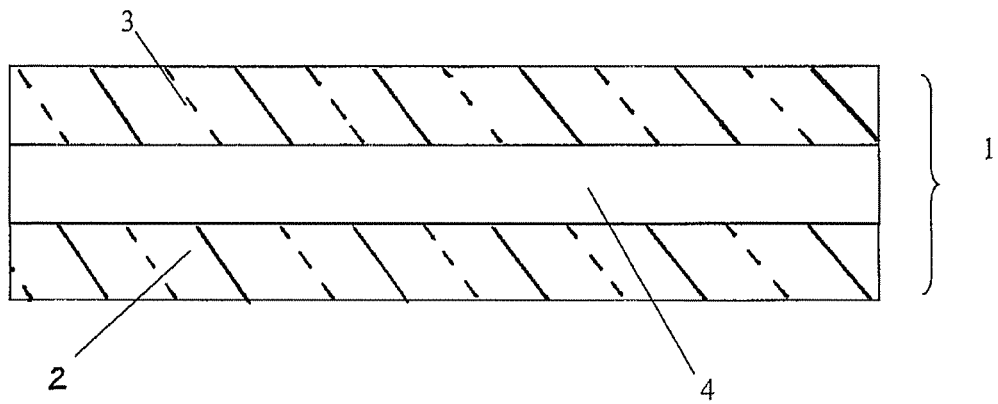
FIG. 1 is a schematic cross-section of a laminated glazing.

In the present invention, it has been appreciated that optical control and acoustic damping properties can be combined within a single interlayer for use in a laminated glazing. FIG. 1 shows a cross-section through a laminated glazing 1. The glazing 1 comprises an inner ply of annealed glass 2 and an outer ply of annealed glass 3, having a generally opaque PVB (polyvinyl butyral) interlayer 4 laminated therebetween. The term "generally opaque" is used to describe an interlayer where the majority of the area of the interlayer is tinted, either by a body tint or a surface tint. The tint acts to reduce both the visible light transmission (LT), and the transmitted energy (TE) directly transmitted through the glazing. The interlayer 4 acts to enhance the acoustic properties of the glazing 1, by providing a sound insulation function.

The sound insulation function is one of acoustic damping, where when laminated between the inner 2 and outer 3 plies of glass, the interlayer 4 reduces the amount of noise transmitted through the glazing. The amount of sound absorbed may be measured in terms of transmission loss, in accordance with DIN EN 20140 or ISO 140. To test in accordance with DIN EN20140, the glazing is mounted in an opening measuring 120 cm×150 cm in a wall between a source room and a receiving room. A loud speaker emits in the frequency range 50 Hz to 10000 Hz, and the difference between the sound levels in the source room and receiving room (with a correction for damping in the receiving room) is the sound reduction in each frequency band. Details of the test are available from DIN Deutsches Institut für Normung e.V., 10772 Berlin, Germany.

However, the transmission loss itself is not just dependent on the acoustic properties of the interlayer, but also the mass and rigidity of the glazing. A lightweight, flexible glazing will have a relatively low transmission loss, whereas a heavier, more rigid glazing will have a higher transmission loss for the same interlayer 4 used. Ideally, the transmission loss should peak at around the frequencies which affect the intelligibility of the human voice. For a glazing comprising two plies of clear glass, each 2.1 mm thick, and a 0.76 mm thick interlayer 4, the transmission loss is preferably greater than 40 dB in the frequency range 3000 to 4000 Hz at 21° C. The actual transmission loss will vary with the temperature of the glazing. However, as a guide, a glazing made with an interlayer in accordance with the present invention will show a significant improvement in acoustic properties when compared with a glazing containing standard (non-acoustic) PVB at both 10° C. and 23° C.

Figure 2:
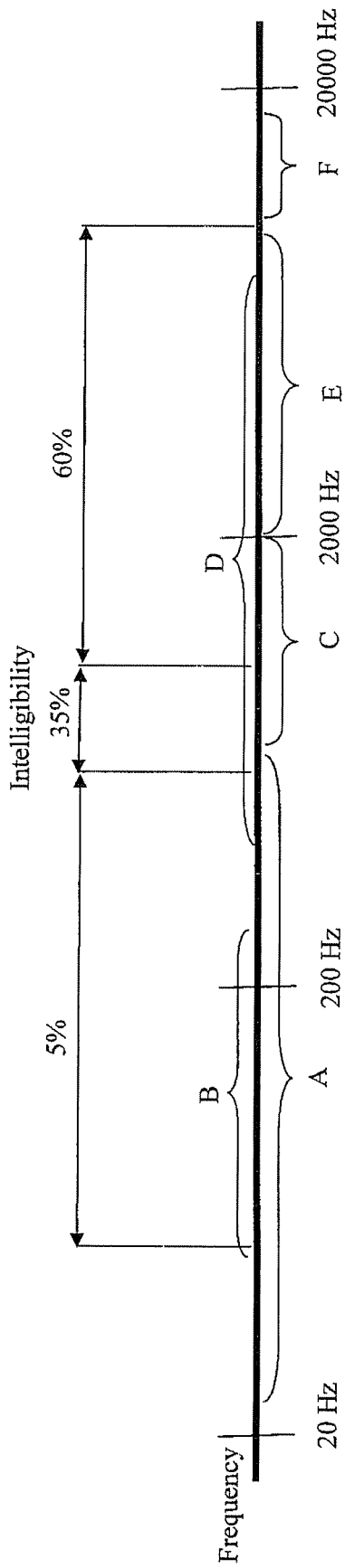
FIG. 2 is a schematic illustration of human voice recognition at increasing frequencies.

FIG. 2 illustrates the relationship between various external vehicle noises on the intelligibility of the human voice within a vehicle. The scale shown is for illustrative purposes only. The human voice has a range of frequencies between approximately 63 Hz and 8000 Hz. However, the contribution of each frequency to the overall intelligibility of the speech heard is not constant. For example, frequencies between approximately 63 Hz and 500 Hz account for only 5% of the intelligibility of speech. Frequencies between approximately 500 Hz and 1000 Hz account for 35% of the intelligibility of speech. Frequencies of between approximately 1000 Hz and 8000 Hz, whilst only accounting for 5% of the power of the voice, account for 60% of the intelligibility of speech.

FIG. 2 also shows the frequencies of the various external vehicle noises detectable by a passenger. These noises include A: coarse road noise; C: tyre noise; D: engine and accessory noise; E: wind and F: brake squeal. The "booming noise" B results from the resonance of the vehicle on the road. From FIG. 2, it can be seen that the noises that affect the intelligibility of the human voice within a vehicle the most are tyre, engine and accessory noise, and wind.

This intelligibility can be quantified to give an indication of a desired acoustic performance of a glazing. An articulation index is a measure of the intelligibility of voice signals, expressed as a percentage of speech units that are understood by a listener when heard out of context. The articulation index is affected by noise, interference and distortion. A "good" articulation index is one which is greater than 50%. An excellent articulation index is one which is greater than 75%. The articulation index is particularly useful in determining the acoustic performance of a glazing in terms of the rpm of the engine of a vehicle. Most diesel engine vehicles have a cruise rpm of around 2500, with petrol engine vehicles having a slightly higher cruise rpm of around 3000. The articulation index of a glazing made using an interlayer in accordance with the present invention should be "good" (above 50%) between 1000 rpm (engine idle) and 4500 rpm (an upper limit of comfortable cruise rpm). In particular, the articulation index of the glazing should be "excellent" (above 75%) in the range 1000 rpm to 3500 rpm.

Figure 3:
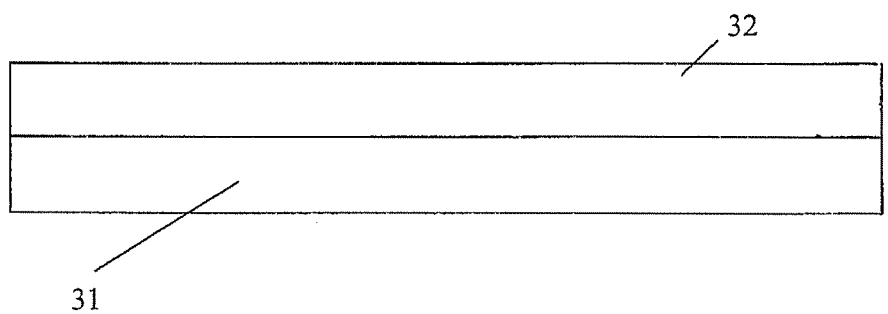
FIG. 3 is a schematic cross-section of a bilayer interlayer.
Figure 4:
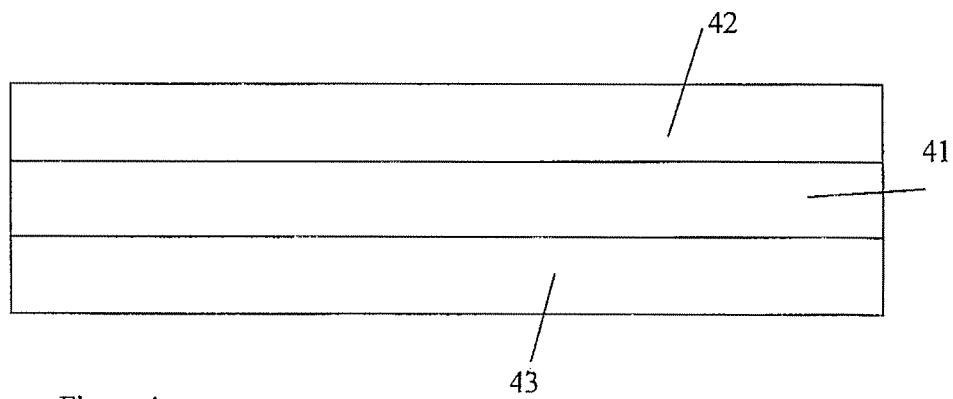
FIG. 4 is a schematic cross-section of a trilayer interlayer.

The interlayer may be tinted by incorporating a liquid dye or a solid pigment into the PVB used to form the interlayer before or during extrusion. The tint may extend all the way through the interlayer, or be concentrated at the surface. In the case of the latter, the dye or pigment may be incorporated into the surface of the finished PVB interlayer by printing. The interlayer itself may be a monolayer, bilayer or trilayer construction. In the case of a bilayer construction, as shown in FIG. 3, the tint may be incorporated into a standard PVB layer 31 laminated with a PVB layer 32 having acoustic damping properties. Alternatively, the tint may be incorporated into the PVB layer 32 having acoustic damping properties. In the case of a trilayer construction, as shown in FIG. 4, the tint may be included in either the inner layer 41 or one or both of the outer layers 42, 43. Preferably, the inner layer 41 provides the acoustic damping properties.

The tint in the interlayer is responsible for the majority of the thermal, solar and optical control properties of a glazing in which it is included. Preferably, the interlayer, when placed between two plies of clear, 2.1 mm thick glass (each having a light transmission, LT, of greater than 88%, when measured using CIE Illuminant A), provides an LT (measured using CIE Illuminant A) of less than 40% and TE (total energy transmission, when measured using ISO9050:E(2003) air mass 1.5) of less than 45%. In table 1 below, the TSHT (total solar heat transmission) is given in accordance with ISO9050:E (2003), air mass 1.5, and the colour box transmission in accordance with a two degree observer using Illuminant D65. As a comparison, a glazing construction having two plies of 2.1 mm thick clear glass (LT of greater than 88%, CIE Illuminant A), laminated with a 0.76 mm thick acoustic interlayer is included in the last line of Table 1.

TABLE 1 typical laminated glazing constructions in accordance with the present invention

| Outer Ply (mm) | Inner Ply (mm) | LT (%) | TE (%) | TSHT (%) | L* | a* | b* |
|---|---|---|---|---|---|---|---|
| Total glazing thickness: 4.0 mm | | | | | | | |
| Dark green 1.6 | Dark green 1.6 | 16 | 14 | 35 | 48 | −8 | 4 |
| Total glazing thickness: 4.5 mm | | | | | | | |
| Dark green 2.1 | Light green 1.6 | 16 | 15 | 35 | 48 | −8 | 4 |
| Dark green 2.1 | Dark green 1.6 | 16 | 13 | 34 | 47 | −9 | 4 |
| Clear 2.1† | Clear 1.6† | 14 | 10 | 26 | 28 | −2 | −7 |
| Total glazing thickness: 5 mm | | | | | | | |
| Light green 2.1 | Light green 2.1 | 17 | 17 | 37 | 49 | −8 | 4 |
| Dark green 2.1 | Light green 2.1 | 16 | 14 | 35 | 48 | −9 | 4 |
| Dark green 2.1 | Dark green 2.1 | 15 | 12 | 33 | 46 | −10 | 4 |
| Dark green 2.1 | Clear 2.1†† | 16 | 15 | 28 | 47 | −7 | 6 |
| Clear 2.1† | Clear 2.1† | 14 | 10 | 26 | 28 | −2 | −7 |
| Comparison: total glazing thickness 5 mm | | | | | | | |
| Clear 2.1 | Clear 2.1 | 89 | 75 | 79 | 96 | −2 | 1 |

†The outer ply of glass comprises an infra-red reflecting coating on the inner side
††The inner ply of glass comprises a low emissivity coating on the outer side In the above table, clear glass has a base composition, including, by weight 72.1% $SiO_2$, 1.1% $Al_2O_3$, 13.5% $Na_2O$, 0.6% $KO_2$, 8.5% CaO, 3.9% MgO and 0.2% $SO_3$ and an $Fe_2O_3$ content of less than 0.15 wt %. Light green glass has a base composition including, by weight, 71.7% $SiO_2$, 1.1% $Al_2O_3$, 13.4% $Na_2O$, 0.6% $KO_2$, 8.5% CaO, 3.8% MgO and 0.2% $SO_3$ and an $Fe_2O_3$ content of ca. 0.6 wt % at 2.1 mm. Dark green glass has a base composition, including, by weight, 71.5% $SiO_2$, 1.1% $Al_2O_3$, 13.4% $Na_2O$, 0.6% $KO_2$, 8.4% CaO, 3.9% MgO and 0.2% $SO_3$ and an $Fe_2O_3$ content of ca. 0.9 wt % at 2.1 mm. Desirably, for laminated glazings where each ply of glass as an $Fe_2O_3$ content of between 0.5 and 1.2 wt %, preferably the LT (CIE Illuminant A) is in the range 10% to 30%, more preferably, 12% to 23%, and the TE (ISO9050:E(2003) air mass 1.5) less than 20%, more preferably less than 16%.

The main advantage of using a tinted acoustic interlayer is that the restriction to use thin, heavily tinted glass to form multifunctional glazings may be avoided. Such glazings can be formed from relatively thin (1 mm to 4.0 mm thick) clear glass, whilst retaining the desired acoustic, thermal and solar control properties. By using lightly tinted glass (glass having an $Fe_2O_3$ content of less than 1.2 wt %), the need to transport costly glass long distances from a float site to a manufacturing site is reduced, as such lightly tinted glasses may be produced more easily and be more widely available. The risk of breakage (by reduction in transport distances) is also reduced, resulting in an overall reduction in cost of the finished glazing.

In particular, the interlayer can be laminated between two plies of glass, at least one of which has a coating which provides additional functionality.

Suitable coatings include low-emissivity coatings, conductive coatings and solar control coatings. A low emissivity coating is a coating which when applied to clear, 3 mm thick float glass, results in the coated glass having an emissivity in the range of 0.05 to 0.45, the actual value being measured in accordance with EN 12898 (a published standard of the European Association of Flat Glass Manufacturers). Hard coatings generally have emissivities between 0.15 and 0.2, whereas off-line coatings generally have emissivities of 0.05 to 0.1. As a comparison, uncoated 3 mm thick float glass has an emissivity of 0.89.

A hard (or pyrolytic) low emissivity coating may comprise a single layer of a metal oxide, preferably a transparent, electrically conductive oxide. Oxides of metals such as tin, zinc, indium, tungsten and molybdenum may be present in the metal oxide layer. Typically, the coating comprises a further dopant, such as fluorine, chlorine, antimony, tin, aluminium, tantalum, niobium, indium or gallium, for example, fluorine-doped tin oxide or tin-doped indium oxide may be used. Such coatings are generally provided with an underlayer, such as silicon or silicon oxynitride. The underlayer acts as a barrier to control migration of alkali metal ions from the glass and/or to suppress iridescent reflection colours caused by variations in thickness of the low emissivity layer.

Off-line (typically sputtered) low emissivity coatings typically comprise a multilayer coating stack, normally including at least one metal layer or electrically conductive metal compound layer, and a dielectric layer. Silver, gold, copper, nickel or chromium may be used as the metal layer, whereas indium oxide, antimony oxide or the like may be used as the electrically conductive compound. Typical multilayer stacks comprise one or two layers of silver deposited between layers of a dielectric such as an oxide of silicon, aluminium, titanium, vanadium, tin, or zinc. Individual layers of such coatings are typically tens of nanometres in thickness.

Typical solar control coatings comprise layers of silver or tin oxide, and control the amount of heat absorbed through the coated glass. Solar control and low emissivity coatings may also be electrically conductive, and so not only provide functionality to the glass in terms of emissivity and heat transmission, but can form an electrically conductive substrate for mounting electrically conductive devices such as LEDs, sensors and cameras.

Heat reflective coatings, which have an element of solar control, for example, a two-layer silver coating, may also be used. Typically, the solar heat reflected by such coatings is greater than 23%, measured in accordance with ISO9050:E (2003), air mass 1.5. Metallic heat reflective coatings may also be electrically conductive, and are particularly useful if the outer ply of glass is of clear glass.

Figure 5:
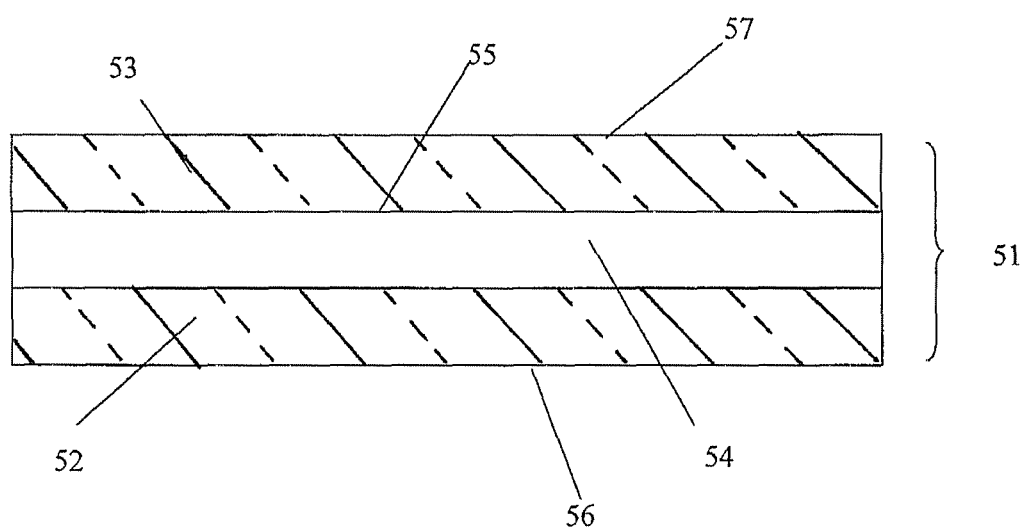
FIG. 5 is a schematic cross-section of a laminated glazing, showing various sites for on line and off line coatings.

FIG. 5 illustrates the surfaces of the glazings where particular coatings may be deposited. In FIG. 5, a laminated glazing 51 comprises an inner ply of glass 52, an outer ply of glass 53 and an interlayer 54 laminated in between. A solar control coating may be deposited on the inner surface 55 of the outer ply of glass 53. The coating may be deposited on line or off line. This surface can then form a substrate for various electronic components. A further coating may be deposited on the outer surface 56 of the inner ply of glass 52. The coating may a low emissivity coating. Both coatings may be electrically conductive, and used as a substrate for at least one electrical device. Solar control coatings are preferably deposited onto clear glass, as, as incident light must reflect off the coating for it to be effective, they are less useful with tinted glasses. Therefore, being able to use clear glass in the outer ply of a laminated glazing with the tinted, acoustic interlayer of the present invention is a significant advantage over previous products.

It is also possible to provide a coating on the outer surface 57 of the outer ply of glass, for example, a self-cleaning coating. Self-cleaning coatings may be hydrophilic, hydrophobic or super-hydrophobic (having a contact angle less than 30°, greater than around 80° and greater than around 120° respectively). In addition, the coating may exhibit photoactivity, where dirt or other organic contaminants present may be structurally degraded when the coating is exposed to ultra violet radiation, and subsequently washed away by water. Hydrophillic coatings are known in particular for building glass. A suitable self-cleaning coating for use with a glazing construction of the present invention is that known as Activ™, available within the UK from Pilkington plc.

Figure 6:
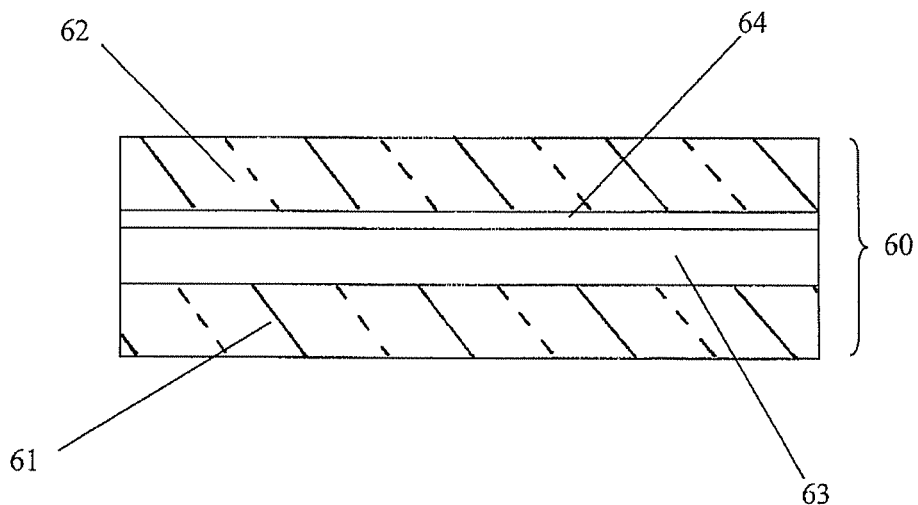
FIG. 6 is a schematic cross section of a first example of a multifunctional laminated glazing.
Figure 7:
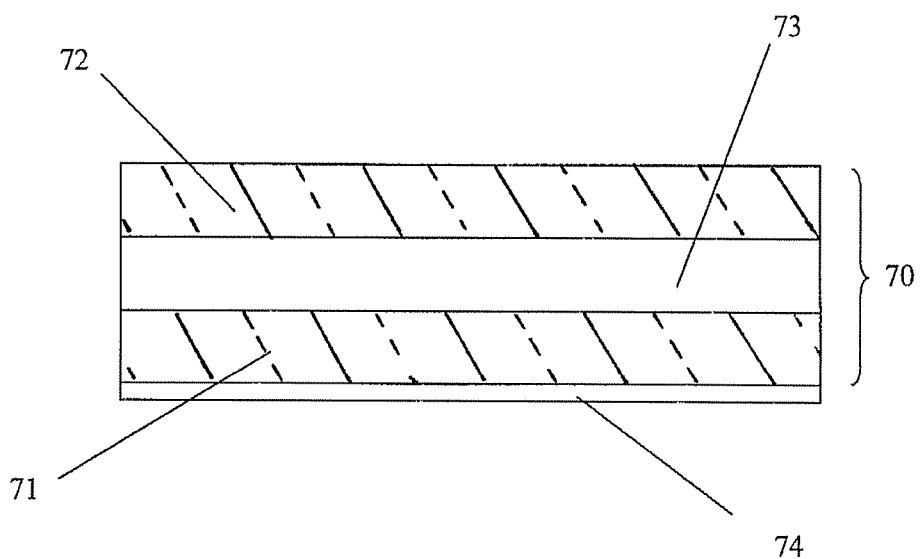
FIG. 7 is a schematic cross section of a second example of a multifunctional laminated glazing.

FIGS. 6 and 7 show two specific examples where the tinted acoustic interlayer of the present invention can be combined with coated glass plies to form a multifunctional glazing. FIG. 6 is a schematic cross section of a laminated glazing 60 comprising an inner ply of glass 61 and an outer ply of glass 62, having a tinted acoustic interlayer 63 laminated in between. An infra-red reflective coating 64, in this example, a double layered metallic silver coating, has been coated off line (once the glass has been manufactured) on the inner surface of the outer ply of glass 62. Such a glazing construction offers additional solar control properties. FIG. 7 is a schematic cross section of a laminated glazing 70 comprising an inner ply of glass 71 and an outer ply of glass 72, having a tinted acoustic interlayer 73 laminated in between. The outer ply of glass 72 has, for example, a standard automotive light (0.6 wt % $Fe_2O_3$), a standard automotive dark green tint (0.9 wt % $Fe_2O_3$) or may be a heavily tinted glass (greater than 1.2 wt % $Fe_2O_3$). The inner ply of glass 71 is clear, and has a low emissivity coating 74, deposited on line (during the manufacture of the glass), on the outer surface of the inner ply. Such a glazing construction offers enhanced thermal properties. Although the inner ply of glass 71 is preferably clear, it may alternatively be of a standard automotive light (0.6 wt % $Fe_2O_3$) or dark green tint (0.9 wt % $Fe_2O_3$), or may be a heavily tinted glass (greater than 1.2 wt % $Fe_2O_3$).

A further advantage of being able to use clear glass to form such glazings is that clear glass may be shaped more easily than heavily tinted glass. In order to form a shaped laminated glazing, for example, one having a complex cross-curvature, the two plies of glass forming the glazing are placed together, fired and shaped in the configuration in which they will be laminated. The outer ply of glass needs to be clear for improved solar reflection. However, if the inner ply of glass is too absorbing, for example, if heavily tinted, optical pitting distortion can occur. Such a problem does not arise with the present invention, as both the inner and outer plies of glass may be of a similar type and iron content, and hence similar absorption.

By using readily available clear or lightly tinted glass, production, shipping and storage costs are significantly reduced when compared with heavily tinted glass. In addition, a large amount of automotive glazing processing and development is designed around using lightly tinted glass.

However, it is possible to use the interlayer with other tinted glasses, if desired. One situation is where at least one ply of glass is tinted, and the interlayer colour matched to the tint of the glass. In particular, the tint of the interlayer may be matched to the light transmission and measured colour of a glass such as that known as GALAXSEE™, available from Pilkington plc in the UK, having a base composition, including by weight 71.1% $SiO_2$, 1.1% $Al_2O_3$, 13.3% $Na_2O$, 0.6% $KO_2$, 8.4% CaO, 3.8% MgO and 0.2% $SO_3$, and a colourant portion comprising, by weight, 1.45% total iron (calculated as $Fe_2O_3$), 0.30% ferrous oxide (calculated as FeO) 230 ppm $CO_3O_4$, 210 ppm NiO and 19 ppm Se. Alternatively, the tint of the interlayer may be matched to the light transmission and measured colour of a glass such as that known as SUNDYM 435™, available from Pilkington plc in the UK, having a base glass composition including, by weight, 71.0% $SiO_2$, 1.1% $Al_2O_3$, 13.3% $Na_2O$, 0.6% $KO_2$, 8.4% CaO, 3.8% MgO and 0.2% $SO_3$, and a colourant portion comprising, by weight, 1.57% total iron (calculated as $Fe_2O_3$), 0.31% ferrous oxide (calculated as FeO), 115 ppm $CO_3O_4$, 0 ppm NiO and 5 ppm Se.

Laminated glazings incorporating a tinted, acoustic interlayer are most useful as rooflights and sidelights in automotive vehicles. However, the interlayer may be used as the shadeband in a windscreen, which incorporates a clear, PVB interlayer having acoustic properties in the visible area of the glazing, and a tinted interlayer in a strip running across the top of the glazing, when fitted in the vehicle, to reduce glare. Typical laminated constructions are shown in table 2 below:

TABLE 2 typical laminated glazing constructions

| Outer ply thickness (mm) | Interlayer thickness (mm) | Inner ply thickness (mm) |
|---|---|---|
| 1.6 | 0.76 | 1.6 |
| 2.1 | 0.76 | 2.1 |
| 2.1 | 0.76 | 1.6 |
| 2.6 | 0.76 | 2.6 |
| 2.3 | 0.76 | 2.3 |
| 3.15 | 0.76 | 2.1 |

For automotive glazings, the thickness of each glass ply used in the glazing construction is preferably between 1 mm and 4 mm. More preferably, at least one of the inner and outer ply of glass has a thickness of at least 1.6 mm, and the overall thickness of the glazing is less than 6.5 mm.

Laminated glazings incorporating a tinted acoustic interlayer of the present invention may also be used in architectural and building applications. In this case, the glass plies used to form the glazing may have a greater thickness than those used in automotive glazings, for example, in the range 1.6 mm to 19 mm.

The invention claimed is:

1. A laminated glazing comprising an inner ply of glass and an outer ply of glass and having an acoustic polyvinyl butyral (PVB) interlayer laminated there between, the interlayer being a trilayer construction of PVB layers including one layer constructed to possess acoustic damping properties that impart sound absorption characteristics to the laminated glazing, the trilayer construction of PVB layers including an inner PVB layer positioned between two outer PVB layers, the inner PVB layer possessing said acoustic damping properties, and at least one of the PVB layers of the trilayer construction is body tinted and another of the PVB layers of the trilayer construction trilayer is not body tinted, and when the interlayer, in a thickness of 0.76 mm, is laminated between two plies of glass, each 2.1 mm thick and having a visible light transmission (LT) greater than 88% (CIE Illuminant A), the resultant glazing has: an LT (CIE Illuminant A) of less than 40%; a transmitted energy (TE) (ISO9050:E(2003), air mass 1.5) of less than 45%; and an acoustic transmission loss of greater than 40 db in the range 3000 to 4000 Hz at 21° C.

2. The laminated glazing of claim 1, wherein the glazing has a colour box transmission, with a 2 degree observer angle using Illuminant D65, in the ranges:
L*: +20 to +60;
a*: −1 to −18; and
b*: −16 to +9.

3. The laminated glazing of claim 1, wherein the inner ply of glass and the outer ply of glass each have an iron content, measured as Fe2O3, of between 0.5 and 1.2 wt%.

4. The laminated glazing of claim 1, comprising a solar control coating on the inner surface of the outer ply of glass.

5. The laminated glazing of claim 1, wherein the inner and outer plies of glass each have a thickness in the range 1 mm to 4 mm.

6. The laminated glazing of claim 1, wherein at least one of the inner and outer ply of glass has a thickness of at least 1.4 mm, and the overall thickness of the laminated glazing is less than 6.5 mm.

7. The laminated glazing of claim 1, wherein the interlayer has a thickness of less than 1 mm.

8. The laminated glazing of claim 1, wherein the inner ply of glass and the outer ply of glass each have an iron content, measured as Fe2O3, of less than 0.15 wt%.

9. The laminated glazing of claim 8, wherein the glazing has an LT (CIE Illuminant A) of less than 35% and a TE (ISO9050:E(2003), air mass 1.5) of less than 35%.

10. The laminated glazing of claim 8, wherein the glazing has an LT (CIE Illuminant A) in the range 10% to 30%.

11. The laminated glazing of claim 8, wherein the glazing has an LT (CIE Illuminant A) in the range 12% to 23%.

12. The laminated glazing of claim 8, wherein the glazing has a TE (ISO9050:E(2003), air mass 1.5) of less than 20%.

13. The laminated glazing of claim 8, wherein the glazing has a TE (ISO9050:E(2003), air mass 1.5) of less than 16%.

14. The laminated glazing of claim 1, comprising a low emissivity coating on the outer surface of the inner ply of glass.

15. The laminated glazing of claim 14, wherein the coating is electrically conductive.

16. The laminated glazing of claim 15, wherein the coating is used as a substrate for at least one electrical device.

17. The laminated glazing of claim 1, wherein the glazing is an automotive glazing.

18. The laminated glazing of claim 17, wherein the automotive glazing is one of a rooflight or a sidelight.

19. The laminated glazing of claim 1, wherein the inner and outer plies of glass each have a thickness in the range 1.6 mm to 19 mm.

20. The laminated glazing of claim 19, wherein the glazing is an architectural glazing.

* * * * *